![United States Patent Office]

3,311,542
Patented Mar. 28, 1967

3,311,542
METHOD OF MAKING SOLID TOTAL
HYDROLYZATE OF STARCH
Ralph W. Kerr, 1858 Venetian Point Drive,
Clearwater, Fla. 33515
No Drawing. Filed Feb. 19, 1965, Ser. No. 434,104
3 Claims. (Cl. 195—31)

This application is a continuation-in-part of my copending application Ser. No. 194,677, filed May 14, 1962, now abandoned.

In my patent application, Ser. No. 80,562, filed Jan. 4, 1961, and now abandoned, and U.S. Patent 2,967,804, methods were disclosed for the preparation of highly purified amyloglucosidase, and enzyme that hydrolyzes amylaceous materials to dextrose Also disclosed in that patent application and patent are the very great improvements that result, particularly in respect to increased dextrose yield, when amyloglucosidase so purified is used in processes to produce dextrose from starch by conventional manufacturing procedures. Broadly, these procedures of the prior art consist of liquefying starch in aqueous media, hydrolyzing the liquefied starch, clarifying and refining the hydrolyzate, concentrating the liquors, crystallizing the dextrose, separating the crystals of dextrose from the mother liquor, and drying the crystallized dextrose. It should be pointed out that one of the most costly and time consuming of these unit processes is the crystallization of the dextrose. Not only is it difficult to crystallize dextrose from an aqueous solution, but it is particularly tedious to crystallize this sugar in a physical form such that it can readily be separated from the mother liquor (called hydrol) in a centrifuge and washed therein, to free the crystals from adhering undesirable impurities. Several patents have issued on procedures for crystallizing dextrose, purporting to meet the problem involved. However, even at best, 2 to 3, or more, days are required, under carefully controlled conditions of temperature and agitation, and with excessively large addition of seed crystals (from a previously made batch) in relatively expensive equipment. The amount of "seed" crystals commonly added in a dextrose crystallization is of the order of 25 percent of the total weight, dry basis, of the batch.

Accordingly, for many years a less costly dextrose containing, solid product was made (omitting the now conventionally used crystallization procedure) by pouring the total starch hydrolyzate, after refining and concentrating, into pans, allowing the liquors to solidify, and then letting these pans stand for several days to "cure" the solid product. These solid blocks were then chipped by use of sharp knives in especially constructed, heavy equipment. This chipped, block sugar consists in a large proportion of very small dextrose crystals, but it also contains, naturally, the mother liquor, or hydrol, as well. Therefore, use of this relatively impure dextrose product was limited only to certain industrial applications where off-odors, bitter taste and less desirable physical form, characteristic of such a product, were tolerable. This is true to an exaggerated degree when hydrolyzates from the older, starch hydrolysis processes, using only acid as the catalytic agent, where used to make the dextrose product. However, even in the newer processes wherein amyloglucosidase containing preparations were used in the hydrolysis, and even when this reaction was extended so that the refined hydrolyzate was of the order of 80 to 95 D.E. (dextrose equivalent: total reducing sugars calculated as percent dextrose, dry basis) the undesirable properties of the solid product, particularly odor, taste and physical form, were still sufficiently prominent so as to limit its use to only certain industrial applications wherein this crude product could be applied. Moreover, this enzyme made, solid dextrose product appeared to be sufficiently hygroscopic so that even when the more costly procedure of spray-drying the hydrolyzate was substituted for casting in pans and chipping, a solid product resulted which when stored or shipped in commonly used bags or containers, packed so badly into solid masses, that it was unusable in many applications, particularly those in which dissolving of the product in water is desired within a reasonable period of time.

It is a primary object of this invention to provide a solid, granular product from clarified, total hydrolyzate of very highly converted starch, that is relatively non-hygroscopic and is sufficiently free of unpleasant odors and taste that it may be used even in the great majority of food applications.

I have discovered that when amyloglucosidase preparations are purified, particularly from transglucosidase, and also from other impurities, as described in my said prior patent application, and patent, and that when this purified amyloglucosidase is used to hydrolyze liquefied starch in aqueous media, a final hydrolyzate results which after clarification, refining and concentration by conventional procedures, crystallizes rather rapidly when poured into pans; and that most surprisingly, this crystallized, solid mass is friable and readily disintegrates into a relatively non-hygroscopic, granular product that may be packed in paper bags, boxes or other ordinary containers and remains granular during shipment or storage; and that moreover, this dextrose product was unanticipatedly found to be of excellent taste and odor, so much so, that it could advantageously be used in food applications, this not withstanding the fact that the product was crystallized total starch hydrolyzate; the crystals had not been separated from any mother liquor whatsoever. These results represent a significant advancement in the art. For now, not only is the yield of an edible, solid sugar product from starch raised to very nearly 100 percent, but also, the costly and time consuming conventional dextrose crystallization process may be dispensed with, and with it, disposition of a bitter, unsightly hydrol sirup, a problem that has long plagued the industry It is believed that these unanticipated properties of the crystallized total hydrolyzate of highly converted starch, produced in accordance with this invention, particularly its lack of hygroscopicity, and the friable nature of the pan-cast product, are due to the fact that the amyloglucosidase used in the hydrolysis is substantially free from transglucosidase. Apparently, even relatively very small quantities of transglucosidase are able, during the extended period of time normally used in the enzymic hydrolysis of starch to dextrose (48 to 96 hours), to produce sufficient amounts of reversion products (e.g., di- and polymeric 1-6, glucosidically linked anhydroglucopyranosides) to cause an undesirable degree of hygroscopicity and cohesion in a solidified hydrolyzate, even one of relatively high D.E. These synthetic reversion products also impart off-flavors to the hydrolyzate primarily due to their extremely bitter taste.

The following examples will serve additionally to describe my invention but they are intended to be illustrative only, and not limiting.

*Example 1*

A sample of amyloglucosidase was prepared substantially in accordance with the procedures given in Example 3 of my aforesaid patent application, U.S. Ser. No. 80,562, as follows:

To 100 liters of a fungal culture liquor that contained 2.0 amyloglucosidase units (A.G.U.) per milliliter, 0.45 gram ash per 100 ml. and an acidity equal to a pH value of 3.8, fuller's earth was added at a ratio of 2 grams per 100 ml. The mixture was stirred for about 30 minutes at room temperature and filtered on a suction filter. The sparking clear filtrate was evaporated under reduced pressure at about 30° C. to 15 liters, to which was then added slowly with vigorous stirring 30 liters of isopropyl alcohol. After standing for about an hour, the liquor was centrifuged, giving a clear centrifugate which was discarded, and a relatively thin, gummy precipitate. The precipitated gum was mixed in a blender with 4 kilograms of dried powdered corn starch, and the damp mass was then vacuum dried to produce 4.2 kilograms of a white powdery product at about 10 percent moisture content.

The dry white powder was found to contain 48 A.G.U. per gram, and substantially no transglucosidase, when tested by procedures given in my aforesaid patent application.

Well washed corn starch from the washing filters of a conventional corn, wet-milling process was stirred into water to give a slurry containing approximately 35 percent dry substance starch content. The slurry showed a pH of 6.5. The starch was gelatinized and liquefied by adding alpha-amylase and heating to about 88° to 90° C. in a vessel provided with agitation (a Therminuter is well suited for this operation) and then held at this temperature for about 30 minutes so that the paste remained a fluid mass when cooled to 60° C.

After the liquefied starch had been cooled to 60° C. and adjusted to pH 4.2 by the addition of hydrochloric acid, the above mentioned, purified amyloglucosidase was added as a 1:10 slurry in water, and at a ratio of 60 A.G.U. per pound of starch, dry basis. The hydrolysis mixture was stirred at 55° to 60° C. for 72 hours, and the hydrolyzate was then clarified by filtration. The clarified hydrolyzate analyzed 98 D.E. by the well known Schoorl modification of the Fehling's test and 96.2 percent true dextrose by the equally well known differential yeast fermentation procedure of Somogyi, both values on a dry substance basis. To the clarified hydrolyzate, 1 percent decolorizing carbon was added with stirring, the mixture was filtered, and the filtrate, after adjusting to about pH 4.6 with sodium carbonate, was concentrated by evaporation under reduced pressure to a dry solids content of approximately 80 to 85 percent. The concentrated liquors were poured into pans and allowed to cool and dry for about 24 hours. A solid, but friable mass resulted that was readily broken up into a white, granular product of pleasant taste and free from undesirable odor. The product was sufficiently nonhygroscopic so that when it was packed in commonly used multi-walled paper bags, the product remained granular, with substantially no caking, even after 3 months' storage under atmospheric conditions.

This product was used as a sweetening agent in the preparation of such food items as cakes, cookies, confections, cooked and canned fruits and in the preparation of a pre-cooked, sugared breakfast food. Duplicate runs were made in preparing these same foods, but using the same proportions of refined, crystalline dextrose, made by conventional procedure of the prior art, instead of the product of this invention, above described. Those food products containing the refined, crystalline dextrose were substantially indistinguishable in each case from the same prepared food that contained the product of this invention.

*Example 2*

The procedures described in Example 1 were repeated, substantially as given, up to the point where final evaporation of the clarified and carbon-treated starch hydrolyzate is begun. In this example a portion of the crystal clear light liquors was drawn into an evaporator under reduced pressure such that the temperature of the liquors were maintained during evaporation within a range of about 75° to 80° C. (instead of the temperature range of 40° to 50° C., used in Example 1). Evaporation was continued until the liquors became sufficiently concentrated so that a portion of the dextrose began to crystalline. Then, while still maintaining the temperature of the evaporating liquors at 75° to 80° C., the balance of the light hydrolyzate liquors was progressively drawn into the evaporator as evaporation was continued. Finally, the concentrated, semi-crystallized batch was discharged progressively, without cooling, into a drying chamber where drying was completed at a temperature of about 100° to 105° C., and the dry product immediately cooled to room temperature. A completely dry, friable product resulted with pleasant taste and odor.

Replicate runs of the procedures used in Examples 1 and 2 normally gave clarified, total starch hydrolyzates with D.E. values within the range of about 98 to 99 and true dextrose contents of about 96 to 97.5 percent, dry basis. For example, the values for the starch hydrolyzate used in the evaporation procedures described in Example 2 were, D.E., 99 and true dextrose content, 97.6 percent, dry basis. The concentrated and solidified total hydrolyzates normally showed, dry basis, 98 to 99 D.E. and from about 96 to 98 percent true dextrose. By chromatographic analysis, these products showed also about 2 to 4 percent of saccharides that result when starch is hydrolyzed: oligosaccharides (sometimes called dextrin) and trace amounts of maltose, isomaltose and panose.

It should be pointed out that the physico-molecular form of dextrose will vary depending mainly on the temperatures of the dextrose liquors undergoing evaporation, crystallization and drying procedures and on the dry-solids to water ratio of the dextrose liquors at these temperatures. Thus, for example, if the temperature of the clarified hydrolyzate does not exceed about 55° C. during the entire interval when the water to dry substance ratio is decreasing from about 30 percent water content to that of the final value of the solid end product, crystals that form will be predominatly alpha-glucose monohydrate. However, if the temperature of the dextrose liquors exceeds about 115° C., particularly during removal of the last 10 percent of water, then as the mass is cooled crystals that form in the substantially dry product will be predominantly beta-glucose. Finally, if the temperature of the clarified hydrolyzate is maintained within the range of about 55° C. to about 115° C. during the entire period within which the last 30 percent of water is removed, then crystals that form will be predominantly anhydrous alpha-glucose. These temperatures and water to dextrose ratio relationships have been pointed out by W. B. Newkirk in Industrial and Engineering Chemistry, vol. 28, page 760 et seq., in 1936, and are now generally well known throughout the industry. Various properties peculiar to each of these physico-chemical forms of dextrose have been reported for products containing them. For example, the solid beta-glucose form is said to have a higher rate of solution in water than the other solid forms, other conditions being equal. However, the herein above disclosed, unanticipated and desirable properties of the solid product made from total starch hydrolyzate according to this invention are exclusive of these unique properties that are peculiar to the particular physico-molecular form of the dextrose that may be in the product, which as above indicated, are determined largely by certain specific conditions under which dextrose liquors are concentrated, crystallized and dried.

*Example 3*

The procedures given in Example 1 were repeated with the exception that in the amyloglucosidase purification, a synthetic water insoluble hydrous magnesium silicate (sold under the trademark Magnesol) was added to the crude enzyme liquors at a ratio of 5 grams per 100 ml. instead of fuller's earth in accordance with the teachings in my application Ser. No. 80,562. The results were substantially the same as obtained in Example 1.

As set forth in my application, Ser. No. 80,562, preclarification adsorbents such as fuller's earth and Magnesol are effective for the purposes of this invention when added to the crude liquors at a ratio of about 2 to 5 grams of adsorbent per 100 ml. of liquor and when the mixture, after adding the adsorbent, is maintained within the pH range of about 4 to 4.5. Hydrochloric acid or sodium hydroxide may be used for pH adjustment. Also as set forth in my said prior patent application, the addition of isopropyl alcohol to the pre-clarified liquors is most effective in precipitating the amyloglucosidase free from transglucosidase and other undesirable impurities, and with a minimum of inactivation of the amyloglucosidase, when the ratio of isopropyl alcohol added is about 1.5 to 2.0 times the volume of the aqueous amyloglucosidase solution, and when the total electrolyte concentration, such as soluble salts, of the mixed liquors is within the range of about 0.10 to 3.5 grams of electrolyte to 100 ml. of the mixed liquors.

*Example 4*

A sample of ground hominy grits (containing starch, protein, and fiber) was treated in water with an alpha-amylase preparation made from a thermal resistant organism (*B. subtilis*) according to the well known procedures to solubilize the starch. To the resulting liquor, transglucosidase-free amyloglucosidase, made by the procedure given in Example 1, was added, and conversion was completed, also by procedures given in Example 1, to make the highly converted solid product.

Surprisingly, and unexpectedly, the concentrated and cooled final liquors set to a friable mass which readily disintegrated into a granular product that was white, relatively non-hygroscopic, and of pleasant taste and odor. On an anhydrous basis, the D.E. was found to be 98 and the true dextrose content 96 percent.

Similar results were unexpectedly obtained when sago flour, farina, starch-gluten-fiber mixtures from the corn wet-milling industry, and other crude sources of starch from which the latter had not been isolated prior to conversion, were processed by procedures substantially the same as those described in the above example, to make the solid conversion product.

*Example 5*

A sample of fungal culture liquor containing amyloglucosidase was purified in accordance with the procedure given in the first paragraph of Example 1 in U.S. Patent 3,117,063. The amyloglucosidase was recovered in solid form from the purified liquor by adding two volumes of alcohol and collecting the precipitate. The purified amyloglucosidase was found to be substantially free from transglucosidase.

The purified amyloglucosidase was now used to hydrolyze liquefied corn starch, clarify and concentrate the decolored total hydrolyzate in the manner as set forth in Example 1 of this specification. A white, relatively non-hygroscopic, granular conversion product, of pleasant taste and free from objectional odor, was produced. On analysis, the product showed on an anhydrous basis, 98.1 D.E. and 96.0 true dextrose.

*Example 6*

A sample of crude amyloglucosidase for freed from transglucosidase by differential acid-inactivation according to the procedures described by R. W. Kerr, F. C. Cleveland and W. J. Katzbeck in a publication titled, "Action of Amyloglucosidase on Starch," published in the Journal of the American Chemical Society in 1951. The solution of amyloglucosidase, now substantially free of transglucosidase activity, was mixed with an equal volume of acetone, and the resulting precipitate was collected, in order to recover the amyloglucosidase in solid form.

A portion of the purified amyloglucosidase was used to hydrolyze a liquefied starch sample in the preparation of a solid, total hydrolyzate product by procedures as given in Example 1. The resulting product was similar in all respects to the product of Example 1.

Naturally, if the solid, total hydrolyzate of this invention is to be made using an amyloglucosidase sample that is substantially free from transglucosidase, additional transglucosidase removing procedures are not required.

*Example 7*

A sample of a solution of amyloglucosidase, prepared from culture liquor of *Rhizopus oryzae* simply by adding water to extract the soluble constituents of a bran culture of the fungus, and filtering the extract, was found to be very nearly free of transglucosidase. The amyloglucosidase was recovered in solid form by adding two volumes of alcohol to the extract and collecting the precipitate. A portion of the solid amyloglucosidase was used to hydrolyze starch in the preparation of a solid total hydrolyzate according to procedures given in Example 1. The solid total hydrolyzate was a white, relatively non-hygroscopic, granular material, relatively free from odor and objectionable taste; analysis showed, anhydrous basis, 99 D.E. and 98 percent true dextrose.

Although I have herein illustrated several particular procedures and several specific reactants, e.g., filtering (instead of centrifuging) and corn starch (instead of tapioca starch), it is obvious that equivalents and alternate procedures will be apparent to the person skilled in the art, and such equivalents and alternatives are understood to be a part of my invention, to the extent that they fall within the scope of the following claims.

I claim:

1. A process for producing an edible, solid, highly converted, total hydrolyzate of starch having a D.E. not less than 98 and a true dextrose content not less than 96 percent, both values on an anhydrous basis, consisting of liquefying starch in aqueous media, hydrolyzing the liquefied starch with amyloglucosidase that has been substantially completely purified from transglucosidase, clarifying the hydrolyzate by filtration, decolorizing the filtrate by means of carbon, and, by heating, concentrating the clarified and decolorized total hydrolyzate of starch to a degree so that said total hydrolyzate is a solid when cooled to atmospheric temperatures, said highly converted, total hydrolyzate of starch being substantially non-hydroscopic and free from unpleasant taste and odors; and said amyloglucosidase purification consisting essentially of adding to an aqueous solution of the enzyme, an insoluble clarification agent that adsorbs substantially none of the amyloglucosidase, and precipitating the active, purified amyloglucosidase from the clarified solution with the addition of about one to two volumes of a water miscible solvent selected from the group consisting of isopropyl alcohol and acetone, said clarified solution of the enzyme being adjusted to a total concentration of soluble salts of between about 0.10 and 3.5 grams per 100 ml.

2. In a process for producing a dextrose product from starch wherein the starch in aqueous system is hydrolyzed with an amyloclucosidase containing enzyme preparation to maximal D.E. and true dextrose contents, the hydrolyzate is clarified, decolorized and evaporated so that the clarified and decolorized total starch hydrolyzate solidifies to form the said dextrose product, the improvement which consists in hydrolyzing the starch with an amyloglucosidase containing preparation which has been purified by adding to its aqueous solution, at a pH value of about 4.0 to 4.5, an insoluble adsorbent selected from the group consisting of a synthetic, hydrous magnesium silicate and fuller's earth, said adsorbent being added to the crude enzyme liquors at a ratio of about 2 to about 5 grams per 100 ml., adding to the clarified amyloglucosidase liquors that have been adjusted in their total concentration of soluble salts to between about 0.10 and 3.50 grams per 100 ml., a volume of isopropyl alcohol equal to about 1.5 to 2.0 times the volume of the aqueous amyloglucosidase and collecting the precipitate that forms which contains the amyloglucosidase, and using said purified amyloglucosidase to hydrolyze starch to dextrose; said hydrolysis resulting in a final hydrolyzate having a D.E.

of 98 to 99 and a true dextrose content of 96 to 97.5 percent on an anhydrous basis; and said dextrose product being granular, relatively non-hydroscopic and free from unpleasant taste and odors.

3. A process for the purification of amyloglucosidase, that renders it substantially free from transglucosidase and other impurities, the presence of which in enzymatic hydrolysis of starch to dextrose by said amyloglucosidase, acts materially to decrease the yield, quality and purity of the dextrose, said purification being effected by adding to its aqueous solution an insoluble adsorbent that removes substantially none of the amyloglucosidase at a pH value of about 4.0 to 4.5, filtering the amyloglucosidase solution to complete the clarification, said clarification adsorbent being selected from the group consisting of a synthetic, water insoluble hydrous magnesium silicate and fuller's earth, and said clarification adsorbent being added to the crude liquors at a ratio of about 2 to about 5 grams per 100 ml., adding to the clarified liquors that have been adjusted in their total concentration of soluble salts to between about 0.10 and 3.50 grams per 100 ml., a volume of isopropyl alcohol equal to about 1.5 to 2.0 times the volume of the aqueous amyloglucosidase and collecting the precipitate that forms which contains the purified amyloglucosidase.

References Cited by the Examiner
UNITED STATES PATENTS

| | | | |
|---|---|---|---|
| 2,893,921 | 7/1959 | Langlois | 195—66 |
| 3,012,944 | 12/1961 | Armbruster et al. | 195—31 |
| 3,039,935 | 6/1962 | Rentschler et al. | 195—11 |
| 3,039,936 | 6/1962 | Lenney et al. | 195—11 |
| 3,042,584 | 7/1962 | Kooi et al. | 195—31 |
| 3,101,302 | 8/1963 | Inglett | 195—66 |

A. LOUIS MONACELL, *Primary Examiner.*

LEWIS GOTTS, *Examiner.*

J. R. BROWN, L. M. SHAPIRO, *Assistant Examiners.*